(12) United States Patent
Yoshikawa et al.

(10) Patent No.: US 9,290,175 B2
(45) Date of Patent: Mar. 22, 2016

(54) VEHICLE CONTROL SYSTEM

(71) Applicants: Hayato Yoshikawa, Susono (JP); Hitoshi Matsunaga, Anjo (JP)

(72) Inventors: Hayato Yoshikawa, Susono (JP); Hitoshi Matsunaga, Anjo (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/428,676

(22) PCT Filed: Sep. 6, 2013

(86) PCT No.: PCT/JP2013/074068
§ 371 (c)(1),
(2) Date: Mar. 17, 2015

(87) PCT Pub. No.: WO2014/045901
PCT Pub. Date: Mar. 27, 2014

(65) Prior Publication Data
US 2015/0239469 A1   Aug. 27, 2015

(30) Foreign Application Priority Data
Sep. 19, 2012   (JP) .................................. 2012-205152

(51) Int. Cl.
*B60W 10/06*   (2006.01)
*B60W 30/02*   (2012.01)
(Continued)

(52) U.S. Cl.
CPC .............. *B60W 30/02* (2013.01); *B60W 10/06* (2013.01); *B60W 10/115* (2013.01); *B60W 10/184* (2013.01); *B60W 30/045* (2013.01); *F16H 59/18* (2013.01); *F16H 59/54* (2013.01);
(Continued)

(58) Field of Classification Search
CPC ... B60W 30/02; B60W 10/06; B60W 30/045; B60W 2540/10; B60W 2710/1005; F16H 61/10; F16H 59/18; F16H 2061/163; F16H 59/58; F16H 2061/0223; F16H 2061/0225; F16H 2061/0227
USPC .......................... 701/55, 56, 62; 477/115, 125
See application file for complete search history.

(56) References Cited

U.S. PATENT DOCUMENTS 5,361,207 A * 11/1994 Hayafune ............... F16H 59/66
                                                       477/120
5,921,889 A   7/1999  Nozaki et al.
(Continued)

FOREIGN PATENT DOCUMENTS

DE   60132743 T2   3/2009
JP   H10-110817 A  4/1998
(Continued)

*Primary Examiner* — Roger Pang
(74) *Attorney, Agent, or Firm* — Kenyon & Kenyon LLP

(57) ABSTRACT

A vehicle control system is provided to control driving force to improve turning performance in a vehicle having an automatic transmission without causing conflict with a shifting control of the transmission. The vehicle control system comprises: a shifting means that carries out a shifting operation of the transmission based on an execution condition including an execution threshold governed by a vehicle speed and an operating amount of an accelerator performed by a driver; a driving force controlling means that carries out a turning performance improving control for stabilizing a vehicle behavior by controlling a driving force during turning; and a shifting condition correcting means that corrects a value of the operating amount of the accelerator as the execution condition during execution of the turning performance improving control.

5 Claims, 5 Drawing Sheets

(51) Int. Cl.
*F16H 59/18* (2006.01)
*B60W 10/115* (2012.01)
*B60W 10/184* (2012.01)
*B60W 30/045* (2012.01)
*F16H 59/54* (2006.01)
*F16H 61/10* (2006.01)
*F16H 61/02* (2006.01)
*F16H 59/58* (2006.01)
*F16H 61/16* (2006.01)

(52) U.S. Cl.
CPC ........... *F16H 61/02* (2013.01); *F16H 61/0213* (2013.01); *F16H 61/10* (2013.01); *B60W 2520/10* (2013.01); *B60W 2540/10* (2013.01); *B60W 2710/1005* (2013.01); *F16H 59/58* (2013.01); *F16H 2061/0223* (2013.01); *F16H 2061/0225* (2013.01); *F16H 2061/0227* (2013.01); *F16H 2061/0234* (2013.01); *F16H 2061/163* (2013.01)

(56) References Cited

U.S. PATENT DOCUMENTS

| | | | | |
|---|---|---|---|---|
| 6,085,137 A * | 7/2000 | Aruga | ............ | F16H 59/66 477/120 |
| 2002/0049116 A1* | 4/2002 | Shiiba | ............ | F16H 59/66 477/97 |
| 2005/0200088 A1 | 9/2005 | Sawada et al. | | |
| 2007/0270279 A1* | 11/2007 | Saitoh | ............ | F16H 61/16 477/110 |
| 2010/0332090 A1* | 12/2010 | Ahn | ............ | F16H 61/0213 701/58 |
| 2012/0143399 A1* | 6/2012 | Noumura | ............ | B60W 30/02 701/1 |

FOREIGN PATENT DOCUMENTS

| | | |
|---|---|---|
| JP | 2001221339 A | 8/2001 |
| JP | 2002139141 A | 5/2002 |
| JP | 2005-256636 A | 9/2005 |
| JP | 2011-218953 A | 11/2011 |

\* cited by examiner

VEHICLE CONTROL SYSTEM

CROSS-REFERENCE TO RELATED APPLICATIONS

This is a national phase application based on the PCT International Patent Application No. PCT/JP2013/074068 filed Sep. 6, 2013, claiming priority to Japanese Patent Application No. 2012-205152 filed Sep. 19, 2012, the entire contents of both of which are incorporated herein by reference.

TECHNICAL FIELD

The present invention relates to a vehicle control system for improving a turning performance of a vehicle to stabilize behavior of the vehicle during turning by controlling a driving force and a braking force.

BACKGROUND ART

In order to stabilize behavior or a posture of a vehicle during turning, according to the conventional turning performance improving control, driving force and braking force of the vehicle are automatically controlled in conjunction with a steering operation performed by a driver. For example, Japanese Patent Laid-Open No. 2005-256636 describes a vehicle stability control system for controlling a driving force in a manner such that a stability factor of the vehicle follows a target value thereof. According to the teachings of Japanese Patent Laid-Open No. 2005-256636, specifically, a basic required driving force during turning is calculated as a physical amount to be generated by drive wheels, and a target value of a stability factor is calculated based on estimated loads applied to the front and rear wheels and an estimated turning radius of the vehicle. The physical amount calculated as the basic required driving force is corrected in a manner such that an actual stability factor of the vehicle follows the calculated target value, and the driving force corresponding to the physical amount thus corrected is generated by the drive wheels.

Japanese Patent Laid-Open No. 2011-218953 describes a driving force controlling system for controlling a driving force of drive wheels in a manner such that a steering characteristic of a vehicle follows a target steering characteristic.

As described, the vehicle stability control system taught by Japanese Patent Laid-Open No. 2005-256636 is configured to control the driving force in a manner to achieve the target stability factor of the vehicle. On the other hand, the driving force controlling system taught by Japanese Patent Laid-Open No. 2011-218953 is configured to control the driving force in a manner to achieve the target steering characteristic. That is, the control systems taught by those prior art documents are configured to carry out a turning performance improving control for stabilizing the vehicle behavior during turning.

Under the turning performance improving control, the driving force is controlled automatically in accordance with a running condition and a behavior of the vehicle irrespective of the driving force required by operating an accelerator or a brake. To this end, for example, a target yaw rate of the vehicle is calculated during turning based on a vehicle speed and a steering angle, and a driving force and a braking force of the vehicle are controlled automatically in a manner to achieve the target yaw rate of the vehicle.

Basically, a vehicle is provided with a transmission for transmitting an engine torque to the drive wheels in accordance with a speed ratio. In the conventional art, for example, an automatic transmission such as a geared transmission having a planetary gear unit and a belt-driven continuously variable transmission are used in vehicles. A gear stage or a speed ratio of the automatic transmission is altered in accordance with a driving force required by operating an accelerator or a brake.

However, if the conventional turning performance improving control is executed in the vehicle having the automatic transmission, a speed change control of the transmission and the turning performance improving control interfere with each other, and consequently a speed change operation is carried out unintentionally. For example, the driver would unconsciously operate the accelerator or brake to adjust the driving force changed by the turning performance improving control. Consequently, the speed change operation would be carried out unnecessarily.

Given that the geared transmission is used in the vehicle, the speed change operation is carried out with reference to a speed change map or a shifting diagram shown in FIG. 6. Basically, the speed change map determines a shifting line based on a vehicle speed and an engine load such as an operating amount of the accelerator or an opening degree of a throttle valve. According to the example shown in FIG. 6, an upshift line and a downshift line are determined based on a vehicle speed and an opening degree of accelerator. That is, the speed change operation is executed upon satisfaction of an execution condition. Specifically, the speed change operation is executed when an operating point representing a running condition of the vehicle is changed across the shifting line. For example, when such operating point moves across the upshift line drawn between the first stage and the second stage, an upshifting is carried out to shift the gear stage from the first stage to the second stage. By contrast, when such operating point moves across the downshift line drawn between the third stage and the second stage, a downshifting is carried out to shift the gear stage from the third stage to the second stage.

However, under the speed change control using the shifting map, the speed change operation would be carried out unintentionally irrespective of the actual running condition as shown in FIG. 7. For example, if the turning performance improving control is carried out when the vehicle is driven at the operating point O0 in FIG. 7, the driving force will be reduced by the turning performance improving control and the operating point is shifted to A0. Thus, the driving force is automatically reduced in spite of keeping the opening degree of the accelerator constant. Consequently, the vehicle is driven at the operating point (A0 in FIG. 7) at which the driving force is reduced.

If the driving force is thus reduced automatically as a result of carrying out the turning performance improving control, the driver would depress an accelerator pedal to compensate such reduction in the driving force. Consequently, an opening degree of the accelerator is increased and the operating point shown in FIG. 7 is thereby shifted from the point O0 to the point BO across the shifting line. In this case, specifically, the operating point is shifted across the downshift line so that the down shifting of the transmission is carried out. Thus, the downshifting would be carried out unintentionally even if the vehicle should be driven under the gear stage to be established at the point O0.

Therefore, the conventional turning performance improving control is required be improved so as to properly control the driving force of the vehicle having the automatic transmission without causing an interference with the speed change control of the transmission.

DISCLOSURE OF THE INVENTION

The present invention has been conceived noting the foregoing technical problem, and it is therefore an object of the present invention is to provide a vehicle control system for properly controlling driving force of the vehicle having an automatic transmission to improve turning performance, without causing a shifting operation of the transmission against the driver's intension and without causing an interference with the shifting control of the transmission.

The vehicle control system according to the present invention is applied to a vehicle having an automatic transmission disposed between a prime mover and drive wheels. In order to achieve the above-explained objective, according to the present invention, the vehicle control system is provided with: a shifting means that carries out a shifting operation of the transmission based on an execution condition including an execution threshold governed by a vehicle speed and an operating amount of an accelerator performed by a driver; a driving force controlling means that carries out a turning performance improving control for stabilizing a vehicle behavior by controlling a driving force during turning; and a shifting condition correcting means that corrects a value of the operating amount of the accelerator as the execution condition during execution of the turning performance improving control.

For example, if the driving force is reduced by the turning performance improving control, the shifting condition correcting means increases the value of the operating amount of the accelerator.

By contrast, if the driving force is increased by the turning performance improving control, the shifting condition correcting means decreases the value of the operating amount of the accelerator.

The vehicle control system is further provided with a shifting probability determining means that determines a threshold of an amount of change in the driving force or the operating amount of the accelerator corresponding to the amount of change in the driving force resulting from executing the turning performance improving control, for determining probability that the shifting operation of the transmission will be caused when an operating condition of the vehicle satisfies the execution condition of the shifting operation. In addition, the shifting condition correcting means includes a means configured to inhibit the correction of the value of the operating amount of the accelerator if the amount of change in the driving force or the operating amount of the accelerator corresponding thereto is smaller than the threshold.

The shifting probability determining means is further configured to determine the threshold based on an amount of change in the driving force required for the operating condition of the vehicle to satisfy the execution condition of the shifting operation.

The shifting means is further configured to determine another execution threshold of the operating amount of the accelerator or an operating rate of the accelerator for carrying out the shifting operation in addition to said execution threshold, and to carry out a downshifting of the transmission if the operating amount of the accelerator or the operating rate of the accelerator is larger than said another execution threshold. In addition, the shifting condition correcting means is further configured to correct said another execution threshold in a manner such that the downshifting is prevented during execution of the turning performance improving control.

Specifically, the threshold is determined based on a difference between an actual operating point and the current execution threshold.

The shifting condition correcting means is further configured to correct the value of the operating amount of the accelerator in a manner such that the shifting operation is carried out at a larger operating amount of the accelerator, if the driving force is reduced by the turning performance improving control.

The shifting condition correcting means is further configured to correct the value of the operating amount of the accelerator in a manner such that the shifting operation is carried out at a smaller operating amount of the accelerator, if the driving force is increased by the turning performance improving control.

Specifically, the execution condition includes a shifting map, and the execution threshold includes a shifting line of the shifting map.

Thus, according to the present invention, the turning performance improving control is carried out to stabilize a vehicle behavior by automatically controlling the driving force during turning. In this situation, the execution condition of the shifting operation of the transmission is temporarily altered. As described, the vehicle speed and the operating amount of the accelerator are employed as the execution condition of the shifting operation, and the value of the operating amount of the accelerator is corrected during execution of the turning performance improving control. According to the present invention, therefore, the shifting operation of the automatic transmission will not be caused unnecessarily against the driver's intension. That is, the driving force can be controlled to improve the turning performance without causing a confliction with the shifting control of the automatic transmission.

It is to be noted that the driving force to be automatically controlled by the turning performance improving control includes not only a driving force in a positive direction for propelling the vehicle but also a driving force in a negative direction that decelerates the vehicle, i.e., a braking force. For example, in case of changing the driving force in the positive direction, an output power of the prime mover is increased. Otherwise, if the braking force has already been generated, the braking force is reduced. By contrast, in case of changing the drive force in the negative direction, an output power of the prime mover is reduced. Alternatively, the braking force is applied to the vehicle or increased.

As also described, given that the driving force of the vehicle is reduced by the turning performance improving control, the value of the operating amount of the accelerator is increased by the shifting condition correcting means. Consequently, the execution condition of the shifting operation is temporarily altered in a manner such that the shifting operation is carried out at a larger operation amount of the accelerator. By contrast, given that the driving force of the vehicle is increased by the turning performance improving control, the value of the operating amount of the accelerator is decreased by the shifting condition correcting means, Consequently, the execution condition of the shifting operation is temporarily altered in a manner such that the shifting operation is carried out at a smaller operation amount of the accelerator. According to the present invention, therefore, the shifting operation of the automatic transmission will not be caused unnecessarily against the driver's intension. That is, the driving force can be controlled to improve the turning performance without causing a confliction with the shifting control of the automatic transmission.

If the shifting probability determining means determines that the probability that the shifting operation of the transmission will be caused by the turning performance improving control is low, the correction of the execution condition of the shifting operation by the shifting condition correcting means is inhibited. Therefore, such correction of the execution condition of the shifting operation will not be carried out unnecessarily so that a required operation of the accelerator is lightened.

In order to allow the shifting probability determining means to determine the probability that the shifting operation of the transmission will be caused by the turning performance improving control, the threshold of the operating amount of the accelerator performed by the driver is used. Therefore, the operation of the accelerator required for the driver will not be increased by avoiding the unnecessary shifting operation.

In addition, according to the present invention, the driving force can be controlled to improve the turning performance without causing a conflict with the shifting control of the transmission, even when carrying out an intentional downshifting such as a power-on downshifting or a kickdown. In order to carry out such intentional shifting operation, another thresholds of the operating amount of the accelerator and the operating rate of the accelerator are used in addition to the aforementioned execution condition of the shifting operation. Specifically, the power-on downshifting or kickdown is allowed when the operating amount of the accelerator and the operating rate of the accelerator respectively exceed another thresholds thereof. Such another thresholds are corrected in a manner such that the downshifting is prevented during execution of the turning performance improving control. According to the present invention, therefore, the power-on downshifting or kickdown will not be caused against the driver's intension during execution of the turning performance improving control.

DESCRIPTION OF THE PREFERRED EMBODIMENT(S)

Figure 1:
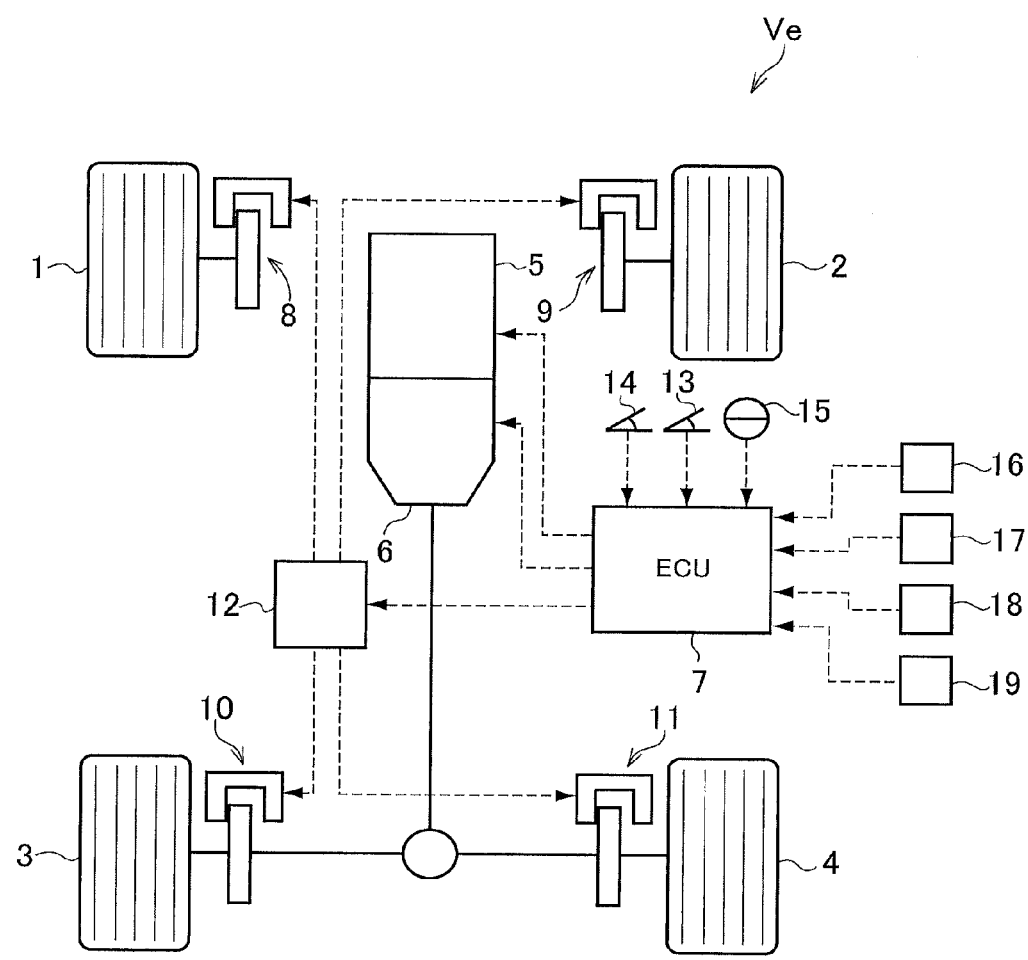
FIG. 1 is a schematic view showing an example of a structure of a vehicle and a control system to which the present invention is applied.

A preferred example of the present invention will now be described with reference to the accompanying drawings. First, a structure of a vehicle and a control system to which the present invention is applied will be explained with reference to FIG. 1. In the vehicle to which the present invention is applied, driving force and braking force can be controlled independent of an accelerator operation or a braking operation performed by a driver. That is, in the vehicle Ve shown in FIG. 1, the driving force and the braking force can be controlled not only manually based on the driving operations of the driver but also automatically. As shown in FIG. 1, the vehicle Ve has a left front wheel 1, a right front wheel 2, a left rear wheel 3, and a right rear wheel 4. Specifically, the vehicle Ve shown in FIG. 1 is a rear-wheel drive layout vehicle in which the rear wheels 3 and 4 are rotated by a power of an engine 5.

For example, an internal combustion engine such as a gasoline engine, a diesel engine a natural gas engine and etc. may be used as the engine 5. The engine 5 is provided with an electronic throttle valve or an electronic fuel injector so that an output power of the engine 5 can be controlled automatically by electrically controlling the throttle valve or the fuel injector.

Figure 6:
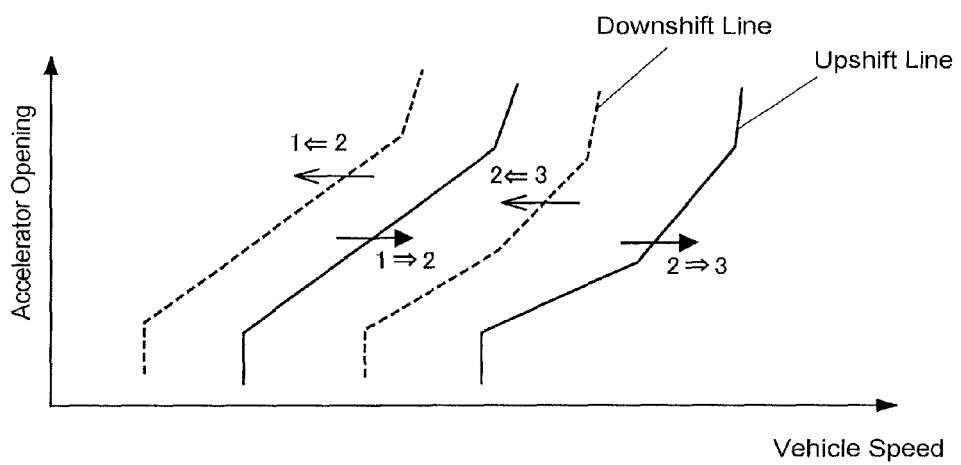
FIG. 6 shows one example of a map for the shifting control of the transmission.
Figure 7:
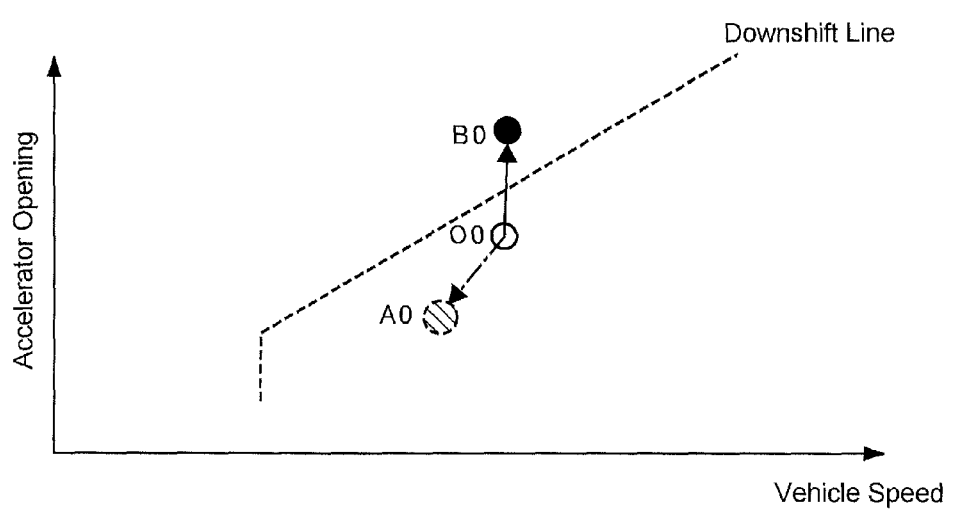
FIG. 7 is a graph showing one example of the shifting control of the automatic transmission under the conventional turning performance improving control.

An automatic transmission 6 is disposed on an output side of the engine 5 to deliver the output torque of the engine 5 to the drive wheels 3 and 4 while changing a speed ratio. For example, a geared transmission having a planetary gear unit and a frictional engagement element, a belt-driven continuously variable transmission or the like may be used as the transmission 6. In the preferred example, the geared transmission is used as the transmission 6, and a shifting operation of the transmission 6 is executed with reference to the shifting map shown in FIG. 6.

In order to control an output of the engine 5 and an action of the transmission 5, the vehicle Ve is provided with an electronic control unit (abbreviated as "ECU" hereinafter) that serves as the controller of the invention. The ECU 7 is electrically connected to the engine 5 so that the driving force of the rear wheels 3 and 4 for propelling the vehicle Ve can be controlled by controlling the output power of the engine 5 by the ECU 7. The ECU 7 is also connected electrically to the transmission 6 so that the speed ratio or the gear stage of the transmission 6 can be changed by the ECU 7.

Each wheels 1, 2, 3, and 4 are individually provided with braking devices 8, 9, 10 and 11. These braking devices 8, 9, 10 and 11 are connected to the ECU 7 through a brake actuator 12. That is, the brake actuator 12 is controlled by the ECU 7 in a manner such that the braking devices 8, 9, 10 and 11 are individually controlled to adjust braking forces applied to the vehicle Ve.

The ECU 7 is configured to receive detection signals from various sensors arranged in the vehicle Ve and information signals from other on-vehicle devices. For example, the ECU 7 receives detection signals from an accelerator sensor 13 that detects a depression angle of an accelerator pedal (or a depression amount, or an opening degree of an accelerator), a brake sensor 14 that detects a depression angle of a brake pedal (or a depression amount or an opening degree of the brake device), a steering angle sensor 15 that detects a steering angle of a steering wheel, a wheel speed sensor 16 that detects rotational speeds (wheel speeds) of the wheels 1, 2, 3, and 4, a longitudinal acceleration sensor 17 that detects longitudinal acceleration of the vehicle Ve (i.e., in a vertical direction in FIG. 1), a lateral acceleration sensor 18 that detects lateral acceleration of the vehicle Ve (i.e., in a horizontal direction in FIG. 1), a yaw rate sensor 19 that detects a yaw rate of the vehicle Ve, a torque sensor (not shown) that detects output torque of the prime mover 5, and so on.

In order to improve turning performance of the vehicle Ve thus structured, steering characteristics or a stability factor of the vehicle Ve are controlled during turning. To this end, specifically, vehicle speed and a friction coefficient of a road surface are estimated from rotational speeds of the wheels 1, 2, 3, and 4 detected by the wheel speed sensor 16, and a target steering characteristics is determined based on the estimated vehicle speed and the friction coefficient, and a steering angle detected by the steering angle sensor 15. Then, actual steering characteristic of the vehicle Ve is controlled to achieve the target steering characteristic.

Specifically, the target steering characteristic can be achieved by controlling a yaw rate of the vehicle Ve while changing driving force and braking force, that is, by carrying out the turning performance improving control. In order to control the yaw rate of the vehicle Ve, a current target yaw rate of the vehicle Ve is calculated based on e.g., a vehicle speed, a steering angle, a wheelbase and etc. Then, an actual yaw rate of the vehicle Ve is controlled to achieve the target yaw rate by carrying out the turning performance improving control. Specifically, the yaw rate of the vehicle Ve is controlled by adjusting a driving torque applied to the driving wheels 3 and 4 or a braking torque applied to the respective wheels 1, 2, 3, and 4 based on a correction torque.

For example, Japanese Patent Laid-Open No. 5-278488 describes the control for adjusting an actual yaw rate to achieve a target yaw rate of a vehicle. As described, Japanese Patent Laid-Open No. 2005-256636 describes the control system configured to control the driving force in a manner to achieve the target stability factor of the vehicle. Japanese Patent Laid-Open No. 2011-218953 also describes a control for adjusting drive force of driving wheels in a manner such that the steering characteristic is adjusted to achieve the target steering characteristics. Thus, basic control contents of the turning performance improving control for automatically controlling the driving force of the vehicle to stabilize behavior or posture of the vehicle during turning are taught by the above-mentioned prior art documents, and hence further explanation therefore will be omitted.

As described, a shifting operation of the transmission 6 would be carried out unintentionally during execution of the turning performance improving control. In order to avoid such a disadvantage, the vehicle control system of the present invention is configured to temporarily alter an execution condition of the shifting operation of the transmission 6, that is, alter a shifting map during execution of the turning performance improving control.

Figure 2:
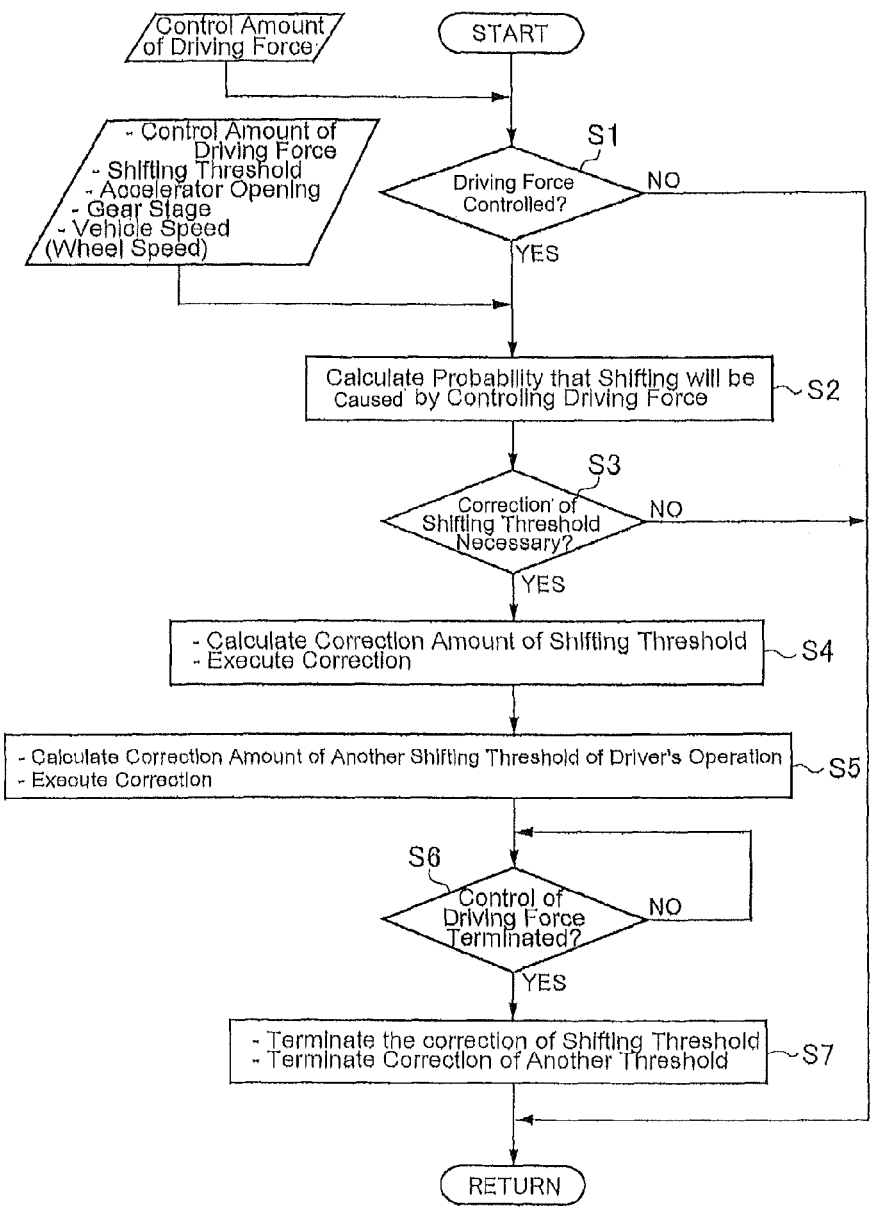
FIG. 2 is a flowchart showing one example of the turning performance improving control and the shifting control of the automatic transmission.

Referring now to FIG. 2, there is shown a flowchart of one example of such control, and the routine shown therein is repeated at predetermined intervals. First of all, it is determined whether or not the driving force is being controlled to improve the turning performance (at step S1). For example, such determination of execution of the control of the driving force can be made based on an existence of an output signal for controlling the driving force in a predetermined control amount.

If the driving force is currently not controlled so that the answer of step S1 is NO, the routine is returned without carrying out subsequent controls.

By contrast, if the driving force is currently controlled to improve the turning performance so that the answer of step S1 is YES, the routine advances to step S2 to calculate a probability that the shifting operation of the transmission 6 will be caused as a result of controlling the driving force, based on the current gear stage (or speed ratio) of the transmission 6, the vehicle speed, the upshift line and the downshift line of the shifting map as the execution conditions of the shifting operation and so on. Specifically, a quantitative value representing the probability of occurrence of the shifting operation by changing the driving force of the vehicle Ve is calculated.

Figure 3:
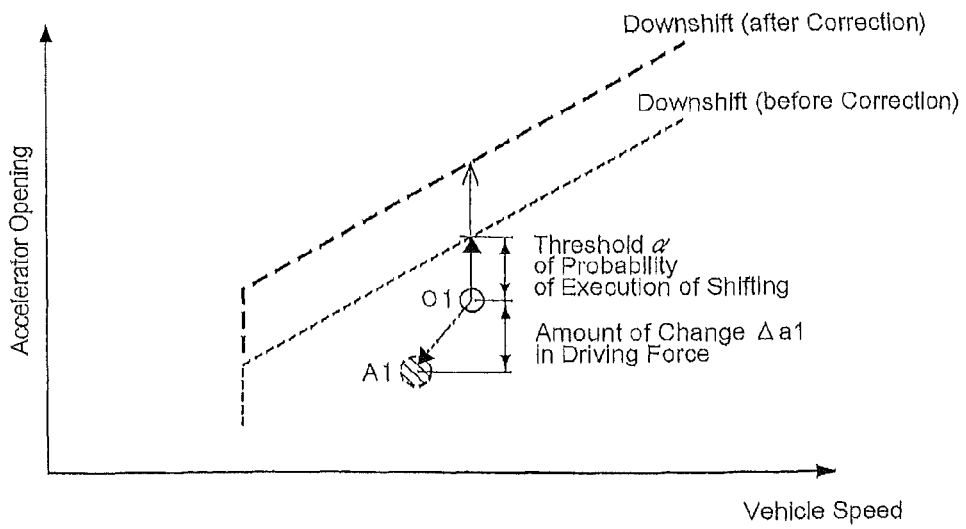
FIG. 3 is a graph showing a correction of an execution threshold (i.e., a shifting line) during execution of the turning performance improving control and the shifting control.

In the shifting map of the transmission 6 shown in FIG. 3, "O1" represents an operating point just before the driving force of the vehicle Ve is changed by the turning performance improving control, and "A1" represents an operating point at which the driving force and the speed of the vehicle are reduced by the turning performance improving control. As described, during the turning performance improving control, the driving force of the vehicle Ve is changed automatically irrespective of the operation of the accelerator performed by the driver. Specifically, the point A1 represents an operating condition where the driving force and the vehicle speed are lowered by reducing an opening degree of the throttle valve of the engine 5 to control the driving force during the turning performance improving control. However, an actual opening degree of the throttle valve is not changed during the migration of the operating point from O1 to A1. If the vehicle is propelled at the point A1, the driver would depress the accelerator pedal to increase the opening degree of the accelerator for the purpose of compensating such reduction in the driving force and the vehicle speed. In this situation, if the opening degree of the accelerator is not changed significantly, the shifting operation will not be caused. However, if the accelerator is depressed deeply, the shifting operation would be executed unintentionally.

In order to avoid such disadvantage, the control system of the present invention is configured to calculate a probability that the shifting operation of the transmission 6 will be caused by controlling the driving force to improve the turning performance. If the calculated probability is high, the control system corrects the execution condition of the shifting operation, in other words, alters a value of an operating amount of the accelerator to carry out the shifting operation in the shifting map. To this end, at step S2, the probability that the shifting operation of the transmission 6 is caused by controlling the driving force is calculated using an amount of change in an operating amount of the accelerator as an index, in other words, using an amount of change in an opening degree of the accelerator as an index. Specifically, an amount of change $\Delta a1$ in an opening degree of the accelerator corresponding to an amount of change in the driving force is calculated to indicate the probability that the shifting operation will be caused by changing the driving force.

Then, at step S3, it is determined whether or not the shifting line of the shifting map is necessary to be corrected. Specifically, it is determined whether or not the amount of change $\Delta a1$ of an accelerator opening calculated at step S2 to indicate the probability of execution of the shifting operation is larger than a threshold $\alpha$. That is, the threshold $\alpha$ is a criterion to correct the shifting map depending on the amount of change $\Delta a1$ of an opening degree of the accelerator. As shown in FIG. 3, the threshold $\alpha$ can be determined based on a distance between the point O1 just before the driving force of the vehicle Ve is changed and the shifting line closest thereto (i.e., the downshift line in FIG. 3). In other words, the threshold $\alpha$ is determined based on a difference in the opening degree of the accelerator between that at the point O1 and the shifting execution threshold thereof. If the amount of change $\Delta a1$ of an opening degree of the accelerator is larger than the threshold $\alpha$, the control system determines that the shifting operation will be caused by controlling the driving force, and therefore corrects the shifting map.

If the amount of change $\Delta a1$ of an opening degree of the accelerator is larger than threshold $\alpha$ so that the answer of step S3 is YES, the routine advances to step S4 to calculate a correction amount of the shifting line and to correct the shifting line based on the calculated correction amount. For example, in case the driving force of the vehicle Ve is lowered to improve the turning performance, the correction amount of the shifting line is calculated in a manner such that the shifting line is shifted in a direction to carry out the shifting operation at a larger opening degree of the accelerator. Then, the shifting line is shifted based on the correction amount thus calculated. Consequently, the shifting line of the shifting map is temporarily isolated away from the current operating point so that the shifting operation is temporarily prevented to be carried out.

By contrast, in case the driving force of the vehicle Ve is increased to improve the turning performance, the correction amount of the shifting line is calculated in a manner such that the shifting line is shifted in a direction to carry out the shifting operation at a smaller opening degree of the accelerator. Then, the shifting line is shifted based on the correction amount thus calculated. Consequently, the shifting line of the shifting map is temporarily approximated to the current operating point so that the shifting operation is temporarily expedited to be carried out. When the driving force of the vehicle Ve is increased to improve the turning performance, the driver would return the accelerator pedal to reduce the opening degree of the accelerator thereby lowering the vehicle speed and the driving force. According to the preferred example, however, the shifting map is corrected to expedite the shifting operation. Therefore, the shifting operation can be executed appropriately.

If the amount of change $\Delta a1$ of an opening degree of the accelerator is smaller than threshold $\alpha$ so that the answer of step S3 is NO, the routine is returned without carrying out subsequent controls. If the shifting map is thus corrected during controlling the driving force to improve the turning performance, the driver would be required a larger operation of the accelerator when carrying out the shifting operation according to his/her intension.

Figure 4:
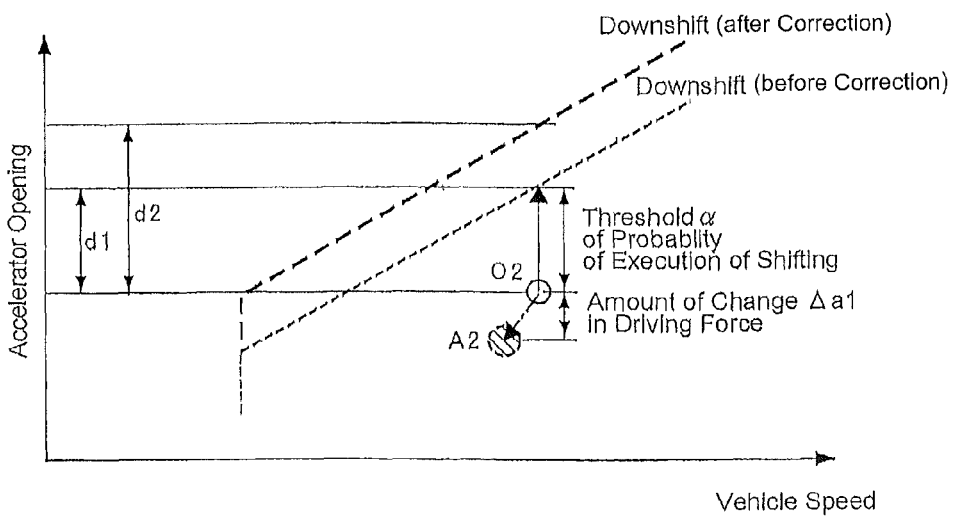
FIG. 4 is a graph showing a correction of the execution threshold (i.e., a shifting line) during execution of the turning performance improving control and the shifting control.

FIG. 4 shows a situation where an amount of change $\Delta a2$ of an opening degree of the accelerator from a prior operating point O2 to a point A2 is smaller than a threshold $\beta$ for determining probability of execution of the shifting operation as a difference between the point O2 and the downshifting line. In this situation, if the downshifting line is corrected as shown in FIG. 4, the driver is required to operate the accelerator largely. That is, if the downshifting line was not corrected, the shifting operation could have been achieved by operating the accelerator in an operating amount d1. In this situation, however, the accelerator has to be operated in an operating amount d2 to carry out a shifting operation. In order to avoid such disadvantage, according to the present invention, the probability that the shifting operation will be caused by controlling the driving force to improve the turning performance is determined taking account of the current operating condition and a control status of driving force. If the control system determines that the probability is low, the correction of the shifting map is inhibited. Therefore, such correction of the shifting line will not be carried out unnecessarily and a required operation of the accelerator is lightened.

Then, at step S5, a correction amount of another execution threshold for carrying out the shifting operation by an operation of the driver is calculated, and another execution threshold is corrected based on the calculated correction amount. Specifically, another execution threshold is prepared in addition to the above-explained execution threshold such as the shifting line used in the shifting map, for the purpose of carrying out a downshifting such as a power-on downshifting or a kickdown based on the driver's intension. To this end, specifically, another execution threshold of an amount or a rate of change in an opening degree of the accelerator is used to determine an execution of the power-on downshifting or the kickdown.

Figure 5:
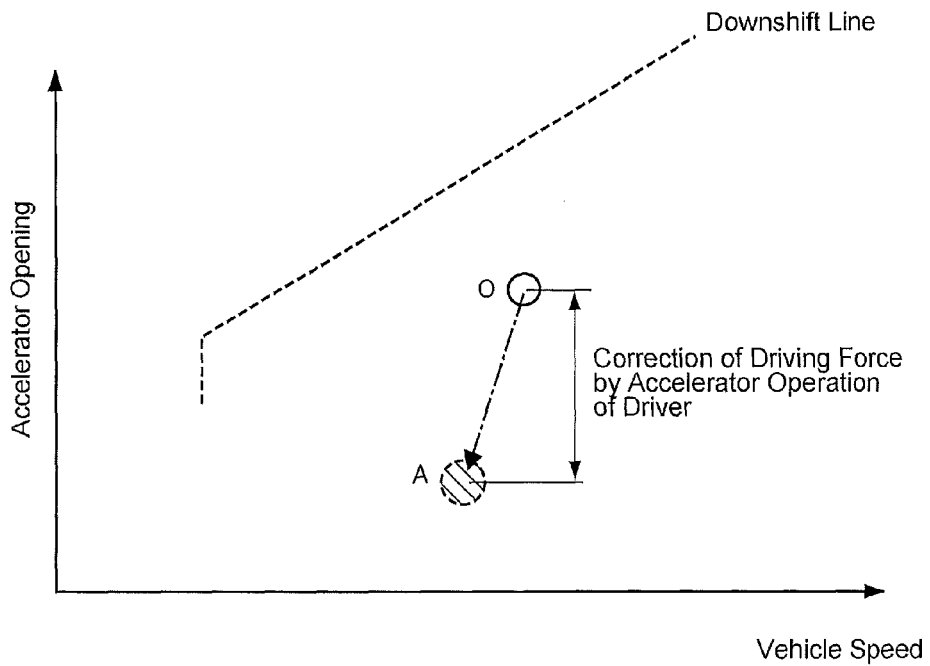
FIG. 5 is a graph showing a correction of the execution threshold of the operation performed by by the driver during execution of the turning performance improving control and the shifting control.

When controlling the driving force to improve the turning performance, another execution threshold is corrected in a manner such that the power-on downshifting or the kickdown is prevented to be carried out. Therefore, even if the driver operates the accelerator to compensate the driving force changed automatically to improve the turning performance as shown in FIG. 5, the power-on downshifting or the kickdown will not be caused against the driver's intension.

After thus correcting the execution threshold of the shifting operation and another execution threshold of the downshifting by the driver's operation, it is determined whether or not the control of the driving force to improve the turning performance is terminated (at step S6). If the control of the driving force has not yet been terminated so that the answer of step S6 is NO, the determination of the step S6 is repeated. That is, such determination of step S6 is repeated until the control of the driving force to improve the turning performance is terminated.

By contrast, if the control of the driving force has already been terminated so that the answer of step S6 is YES, the routine advances to step S7 to terminate the correction of the execution threshold of the shifting operation and the correction of another execution threshold of the downshifting by the driver's operation. Consequently, the execution threshold of the shifting operation and another execution threshold of the downshifting by the driver's operation are returned to the normal values. Then, the routine is returned.

Thus, the vehicle control system of the present invention is configured to execute the turning performance improving control while the vehicle Ve is turning by controlling the driving force automatically. In addition, the vehicle control system temporarily alters the execution conditions of the shifting operation of the transmission 6 during execution of the turning performance improving control.

As described, according to the preferred example, the execution condition of the shifting operation is governed by the vehicle speed and the operation amount of the accelerator. That is, a value of the operating amount of the accelerator is corrected during execution of the turning performance improving control. For example, when the driving force of the vehicle Ve is reduced to improve the turning performance, the threshold of the opening degree of the accelerator is temporarily increased to execute the shifting operation at a larger opening degree of the accelerator. By contrast, when the driving force of the vehicle Ve is increased to improve the turning performance, the threshold of the opening degree of the accelerator is temporarily reduced to execute the shifting operation at a smaller opening degree of the accelerator.

According to the present invention, therefore, the control of the driving force to improve the turning performance of the vehicle Ve and the shifting control of the transmission 6 can be executed properly without causing a confliction. For this reason, the shifting operation of the transmission 6 will not be caused unnecessarily against the driver's intension.

Here will be briefly explained a relation between the preferred example and the claimed invention. The functional block of step S2 serves as the claimed "shifting probability determining means", and the functional blocks of steps S3, S4 and S5 serves as the claimed "shifting condition correcting means".

In the foregoing preferred example, the vehicle control system of the present invention is applied to the vehicle Ve having the automatic transmission 6. However, it is to be understood that the present invention is not limited to the details disclosed. For example, the vehicle control system of the present invention may also be applied to a vehicle having a continuously variable transmission to properly execute the turning performance improving control of the vehicle and the speed change control of the transmission without confliction. In general, the speed change control of the continuously variable transmission is carried out with reference to a speed change map using a vehicle speed, an engine speed and an accelerator opening as parameters. Therefore, the vehicle control system of the present invention may also be applied to correct an operating amount of the accelerator of the speed change map during execution of the turning performance improving control.

For example, if the driving force of the vehicle is reduced to improve the turning performance, the vehicle control system corrects the speed change map of the continuously variable transmission in a manner such that the speed change operation is prevented by increasing a threshold value of the operating amount of the accelerator. Therefore, the turning performance improving control of the vehicle and the speed change control of the transmission may also be carried out properly without causing confliction even if the continuously variable transmission is employed in the vehicle.

The invention claimed is:

1. A vehicle control system that is applied to a vehicle having an automatic transmission disposed between a prime mover and drive wheels, comprising:
   a shifting means that carries out a shifting operation of the transmission based on an execution condition including an execution threshold governed by a vehicle speed and an operating amount of an accelerator performed by a driver;
   a driving force controlling means that carries out a turning performance improving control for stabilizing a vehicle behavior by controlling a driving force during turning;
   a shifting condition correcting means that corrects a value of the operating amount of the accelerator as the execution condition during execution of the turning performance improving control;
   a shifting probability determining means that determines a threshold of an amount of change in the driving force or the operating amount of the accelerator corresponding to the amount of change in the driving force resulting from executing the turning performance improving control, for determining probability that the shifting operation of the transmission will be caused when an operating condition of the vehicle satisfies the execution condition of the shifting operation; and
   wherein the shifting condition correcting means includes a means configured to inhibit the correction of the value of the operating amount of the accelerator if the amount of change in the driving force or the operating amount of the accelerator corresponding thereto is smaller than the threshold.

2. The vehicle control system as claimed in claim 1, wherein the shifting probability determining means includes a means configured to determine the threshold based on an amount of change in the driving force required for the operating condition of the vehicle to satisfy the execution condition of the shifting operation.

3. The vehicle control system as claimed in claim 1, wherein the shifting condition correcting means includes a means configured to increase the value of the operating amount of the accelerator if the driving force is reduced by the turning performance improving control.

4. The vehicle control system as claimed in claim 1, wherein the shifting condition correcting means includes a means configured to decrease the value of the operating amount of the accelerator if the driving force is increased by the turning performance improving control.

5. The vehicle control system as claimed in claim 1,
   wherein the shifting means includes a means configured to determine another execution threshold of the operating amount of the accelerator or an operating rate of the accelerator for carrying out the shifting operation in addition to said execution threshold, and to carry out a downshifting of the transmission if the operating amount of the accelerator or the operating rate of the accelerator is larger than said another execution threshold; and
   wherein the shifting condition correcting means includes a means configured to correct said another execution threshold in a manner such that the downshifting is prevented during execution of the turning performance improving control.

\* \* \* \* \*